United States Patent [19]
Yang

[11] Patent Number: 5,638,352
[45] Date of Patent: Jun. 10, 1997

[54] OPTICAL PICKUP DEVICE

[75] Inventor: Keun Y. Yang, Seoul, Rep. of Korea

[73] Assignee: Goldstar Co., Ltd., Seoul, Rep. of Korea

[21] Appl. No.: 425,067

[22] Filed: Apr. 19, 1995

Related U.S. Application Data

[63] Continuation of Ser. No. 70,868, Jun. 3, 1993, abandoned.

[30] Foreign Application Priority Data

Jun. 3, 1992 [KR] Rep. of Korea ............... 9635/1992

[51] Int. Cl.[6] .................................................. G11B 7/09
[52] U.S. Cl. ................... 369/112; 369/44.14; 369/44.23; 369/103
[58] Field of Search ................ 369/44.37, 44.38, 369/44.41, 44.42, 44.11, 44.14, 44.23, 112, 109, 110, 103; 250/201.5

[56] References Cited

U.S. PATENT DOCUMENTS

| | | |
|---|---|---|
| 4,904,856 | 2/1990 | Nagahama et al. ............... 250/201.5 |
| 4,907,847 | 3/1990 | Onayama et al. . |
| 4,929,044 | 5/1990 | Arimoto et al. . |
| 4,929,823 | 5/1990 | Kato et al. .............. 250/201.5 |
| 4,945,529 | 7/1990 | Ono et al. ................. 369/109 |
| 5,016,954 | 5/1991 | Onayama et al. . |
| 5,049,732 | 9/1991 | Nagahama et al. ............... 250/201.5 |
| 5,101,389 | 3/1992 | Ohuchida et al. ............... 369/44.23 |
| 5,111,448 | 5/1992 | Komma et al. ............... 364/44.23 |
| 5,231,620 | 7/1993 | Ohuchida ..................... 369/109 X |

*Primary Examiner*—Thang V. Tran

[57] ABSTRACT

An optical pickup device using hologram optical elements, the pickup device including a laser diode and, a hologram glass plate diffracting a laser beam emitted from the laser diode and dividing and condensing the laser beam reflected by an optical disc. The hologram glass plate is arranged at the front of the laser source while being spaced apart from the laser diode by a predetermined distance and is provided with four holograms. A collimator is arranged at the front of the hologram glass plate and changes the laser beam emitted from the laser source as well as the laser beam reflected by the optical disc into a parallel beam. An objective lens focuses the parallel laser beam from the collimator on the optical disc. A pair of focusing photo detectors and a pair of tracking photo detectors are also provided at the front of the laser diode and detect the laser beams diffracted and condensed by the holograms of the hologram glass plate in the form of data reading signals. In order to compensate a focusing error and a tracking error, an error compensating actuator is arranged at a side of the objective lens and moves the objective lens in accordance with error signals detected by the focusing and tracking photo detectors.

10 Claims, 11 Drawing Sheets

OPTICAL PICKUP DEVICE

This application is a continuation of application Ser. No. 08/070,868 filed on Jun. 3, 1993, now abandoned.

BACKGROUND OF THE INVENTION

1. Field of the Invention

The present invention relates in general to an optical pickup device used in, for example, a compact disc player, for reading data recorded on an optical disc, and more particularly to an optical pickup device using holographic optical elements.

2. Description of the Background Art

Recently, the use of optical discs such as compact discs and laser discs have been greatly increased. In the future, these optical discs will be used in all technical fields, by virtue of their advantages, including the capability of storing a lot of information and convenience of use.

Such optical discs require an optical pickup device for reading information recorded thereon.

Figure 1:
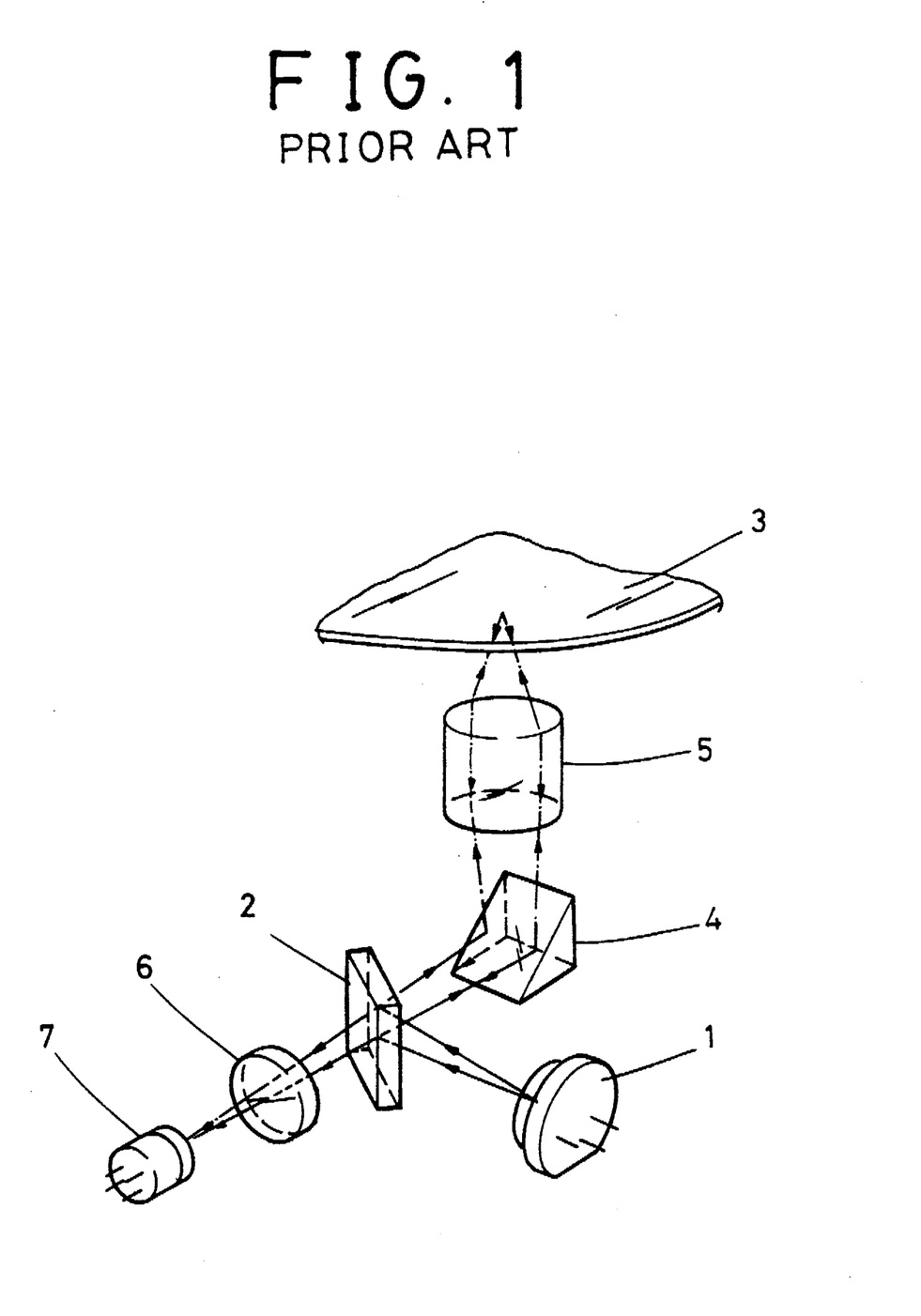
FIG. 1 is a schematic perspective view showing an optical system of an optical pickup device in accordance with the background art.

With reference to FIG. 1, a known optical pickup device comprises a laser diode 1 used as a light source, and a half mirror 2 reflecting the laser beam emitted from the laser diode 1. In order to read the information recorded on the optical disc 3, the laser beam reflected by the half mirror 2 is focused on the disc 3. To achieve the above object, a 45° reflection mirror 4 and a focusing lens 5 are positioned between the half mirror 2 and the optical disc 3. Here, the 45° reflection mirror 4 reflects the laser beam reflected by the half mirror 2 to the focusing lens 5 which focuses the laser beam on the disc 3. The known optical pickup device further includes a condensing lens 6 which condenses the laser beam, reflected by the optical disc 3, to a photo detector 7 which detects the condensed laser beam so as to read the information recorded on the disc 3.

In the above optical pickup device, the laser beam emitted from the laser diode 1 is reflected by the half mirror 2 and in turn focused on the optical disc 3 by way of the 45° reflection mirror 4 and the focusing lens 5.

The laser beam focused on the optical disc 3 is, thereafter, reflected by the disc 3 and varied in its light intensity in accordance with different shapes of the recorded bumps or pits of the optical disc 3. The laser beam reflected by the disc 3 reversely passes through the above optical path. That is, the reflected laser beam is transmitted through the half mirror 2 and condensed by the condensing lens 6 to the photo detector 7 adapted for detecting a laser beam.

That is, the intensity of the laser beam condensed by the condensing lens 6 is detected by the photo detector 7, thereby achieving the reading of the information recorded on the optical disc 3.

However, the known optical pickup device undesirable has a large optical system since it should be provided with the half mirror 2 as well as the 45° reflection mirror 4. Additionally, the laser diode 1 and the photo detector 7 are separately provided in the optical pickup device and this makes the size of the pickup device larger. In addition, a relatively longer time elapses from when the laser beam, reflected to and focused on the optical disc 3, reaches the photo detector 7, so that the known optical pickup device carries out the information reading operation slowly. Furthermore, all the elements of the known pickup device are separately mounted, thus requiring a longer assembling time, deteriorating the assemblage and resulting in increase of manufacturing cost.

SUMMARY OF THE INVENTION

It is, therefore, an object of the present invention to provide an optical pickup device in which the aforementioned problems can be overcome and which achieves the recent trend of compactness and light weight by using holographic elements for the optical elements, including varieties of lenses, and by constructing the photo detector and the laser diode into one module.

To accomplish the above object, an optical pickup device of the present invention comprises a laser diode generating a laser beam, a collimator changing the laser beam emitted from the laser diode to a parallel beam, an objective lens focusing the parallel laser beam on an optical disc and arranged at the front of the collimator, a hologram glass plate diffracting the laser beam emitted from the laser diode and diffracting and condensing the laser beam, reflected by the optical disc and transmitted through the objective lens and condensed by the collimator, the hologram glass plate being arranged between the laser diode and the collimator, and a plurality of photo detectors detecting the laser beam, divided and condensed by the hologram glass plate, and reading data recorded on the optical disc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The above and other objects, features and other advantages of the present invention will be more clearly understood from the following detailed description taken in conjunction with the accompanying drawings, which are given by way of illustration only and thus are not limitative of the present invention in which:

FIGS. 2C and 2D show laser beams diffracted and condensed by individual holograms of the hologram glass plate and intercepted by individual focusing photo detectors, respectively, in which:

FIGS. 3A and 3B show locations of the focusing and tracking photo detectors with respect to the hologram glass plate of the present invention, respectively, in which:

DESCRIPTION OF THE PREFERRED EMBODIMENTS

Figure 2A:
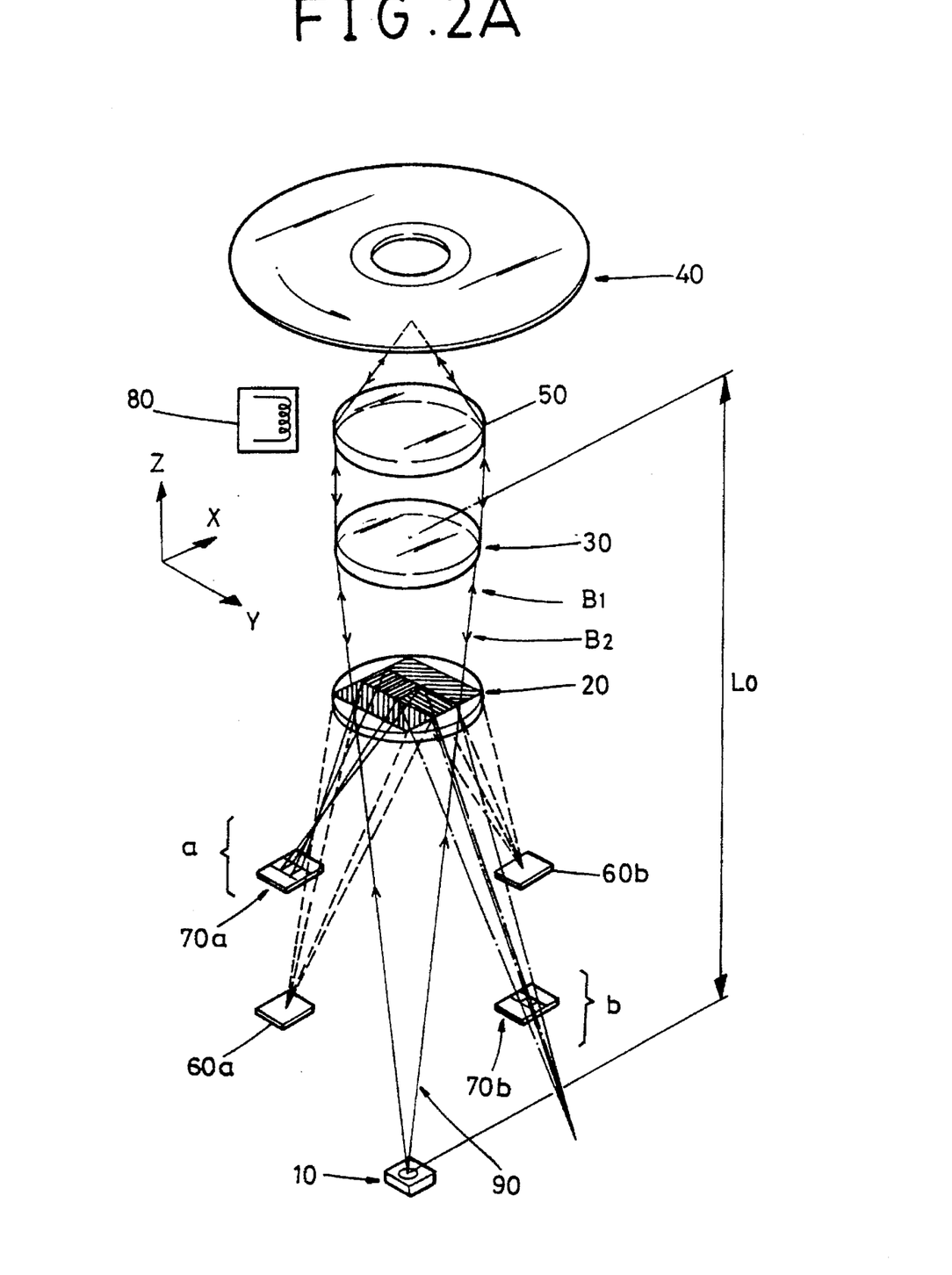
FIG. 2A is a schematic perspective view showing an optical system of an optical pickup device in accordance with an embodiment of the present invention.

With reference to FIG. 2A, there is shown an optical system of an optical pickup device, suitable for use in a compact disc player, according to the present invention. The optical pickup device comprises a laser diode 10, used as a laser source, and a hologram glass plate 20 arranged at the front of the laser diode 10 to diffract the laser beam of the laser diode 10 and to divide the laser beam reflected by an optical disc 40 into four laser beams. A collimator 30 is arranged at the front of the hologram glass plate 20 and condenses the laser beam from the plate 20 in the form of a parallel beam. At the front of the collimator 30, an objective lens 50 is arranged to focus the parallel laser beam from the collimator 30 on the optical disc 40. The optical pickup device of this invention further includes four photo detectors 60a, 60b, 70a and 70b, which are arranged at individual positions at the front of the laser diode 10. The positions of the photo detectors are inclined with respect to the perpendicular of the plate 20 at predetermined inclination angles. Here, the laser beam focused on the optical disc 40 is reflected thereby so as to reach the hologram glass plate 20 by way of the objective lens 50 and the collimator 30, and is divided into four laser beams and condensed by the hologram glass plate 20. The divided and condensed laser beams are received and detected by the four photo detectors 60a, 60b, 70a and 70b, respectively, thereby causing the data recorded on the optical disc 40 to be read.

In addition, an error compensating actuator 80 is arranged at the right or left side of the objective lens 50 to adjust the position of the objective lens 50 in accordance with the laser beam signals, respectively detected by the photo detectors 60a, 60b, 70a and 70b, thus compensating the tracking error as well as the focusing error.

Figure 2B:
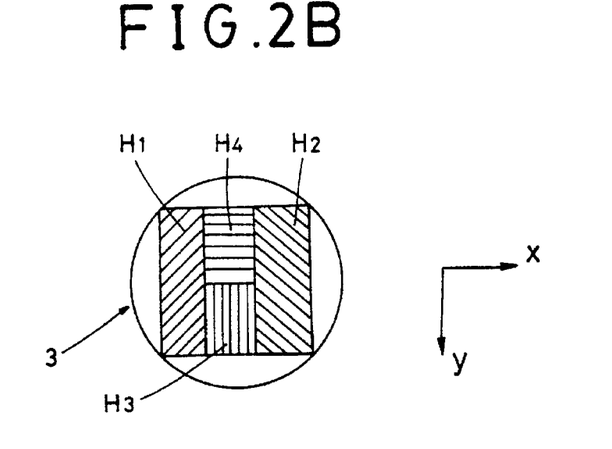
FIG. 2B is a plan view of a hologram glass plate of the optical pickup device of the present invention.

Turning to FIG. 2B, the hologram glass plate 20 is provided with first to fourth holograms H1 to H4 stuck on the glass surface. Here, the first and second holograms H1 and H2 are arranged in the X-direction, that is, in the rotating direction of the optical disc 40, while the other holograms H3 and H4 are arranged in the Y-direction, that is, in the radial direction of the optical disc 40.

Figure 4A:
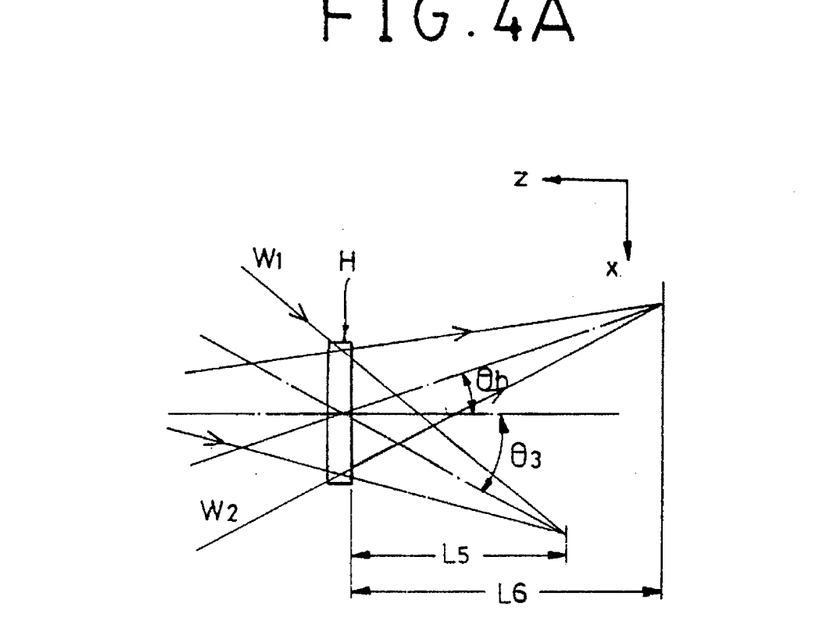
FIG. 4A is a schematic side view showing a manufacturing method of first and second holograms of the hologram glass plate of FIG. 2B.
Figure 4B:
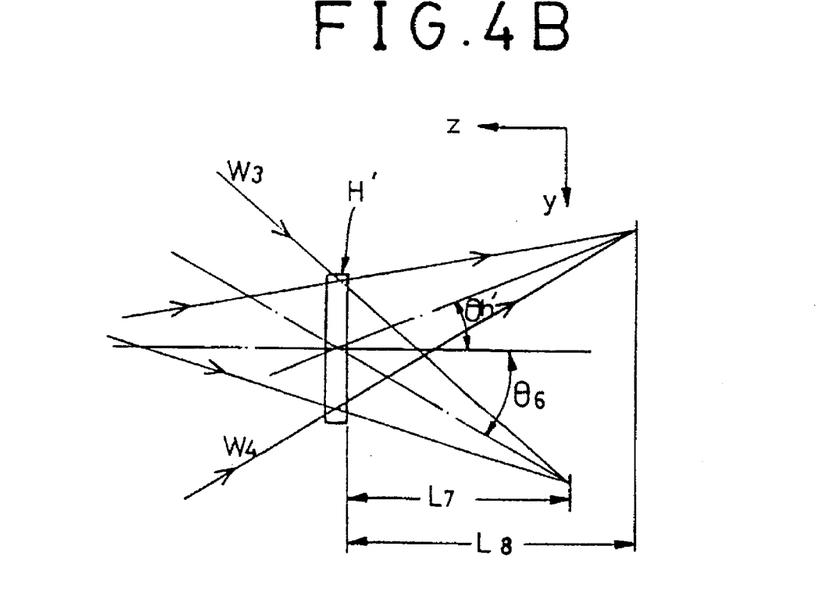
FIG. 4B is a schematic side view showing a manufacturing method of third and fourth holograms of the hologram glass plate of FIG. 2B.

Conventionally, the holograms are manufactured employing a pair of object beams W1 and W3 and a pair of reference beams W2 and W4, as represented in FIGS. 4A and 4B. Each of the objective beams W1 and W3 and the reference beams W2 and W4 have the same wavelength as that of the laser beam generated by the laser diode 10.

As shown in FIG. 4A, the first object beam W1 is applied to a hologram plate H while being inclined with respect to the perpendicular of the hologram plate H at an inclination angle $\theta 3$ and condensed on a position spaced apart from the hologram plate H by a predetermined distance L5. The first reference beam W2 is applied to the hologram plate H while being inclined with resepct to the perpendicular of the hologram plate H at an inclination angle $\theta h$ and condensed on a position spaced apart from the hologram plate H by a predetermined distance L6. The second object beam W3 is applied to a hologram plate H' while being inclined with respect to the perpendicular of the hologram plate H' at an inclination angle $\theta 6$ and condensed on a position spaced apart from the hologram plate H' by a predetermined distance L7. The second reference beam W4 is applied to the hologram plate H' while being inclined with respect to the perpendicular of the hologram plate h" at an inclination angle $\theta h'$ and condensed on a position spaced apart from the hologram plate H by a predetermined distance LB. The two objective beams W1 and W3 as well as the two reference beams W2 and W4 each are spherical wave beams.

The first to fourth holograms Hi to H4 each having the same wavelength as that of each of the beams W1 to W4 are manufactured in manners represented in FIGS. 2A to 5B, respectively.

Figure 3A:
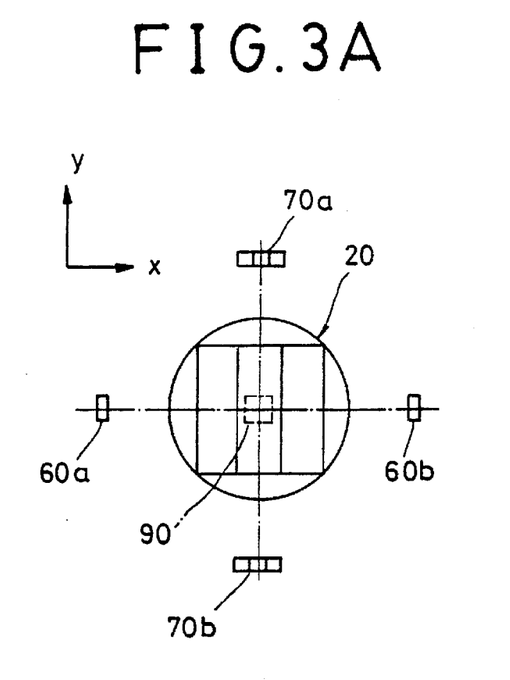
FIG. 3A is a plan view.
Figure 3B:
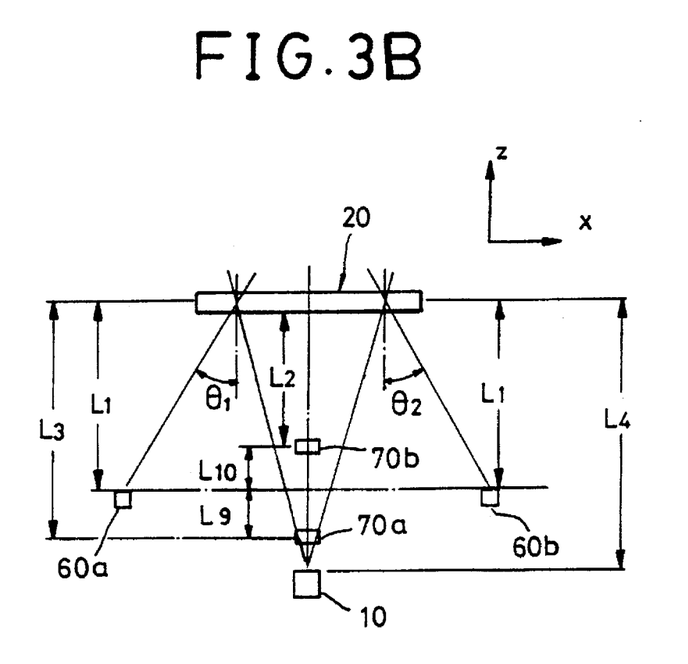
FIG. 3B is a side view.
Figure 5A:
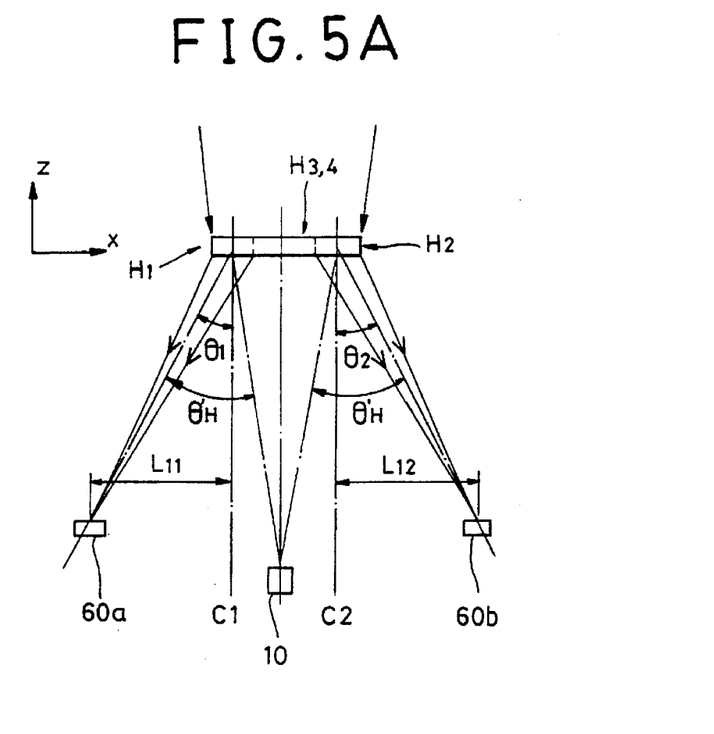
FIG. 5A is a schematic side view showing a laser beam diffracting and condensing operation of the first and second holograms of the hologram glass plate of FIG. 2B.

That is, the inclination angle, or optical axis, $\theta 3$ of the first object beam W1 with respect to the perpendicular of the hologram plate H of FIG. 4A is equal to each of the diffraction angles $\theta 1$ and $\theta 2$ of the condensed laser beams, diffracted by the first and second holograms H1 and H2, with respect to the perpendiculars C1 and C2 of those holograms H1 and H2 of FIGS. 3B and 5A. The distance L5 between the hologram plate H and the condensed position of the first object beam W1 of FIG. 4A is equal to the distance L1 between the hologram glass plate 20 and the photo detectors 60a and 60b of FIGS. 3B and 5B. The distance L6 between the hologram plate H and the condensed position of the first reference beam W2 of FIG. 4A is equal to the distance L4 between the hologram glass plate 20 and the laser diode 10 of FIG. 3B.

Here, the tracking photo detectors 60a and 60b re located at the condensed positions of the laser beams condensed by the first and second holograms H1 and H2 of the hologram glass plate 20, respectively.

Figure 5B:
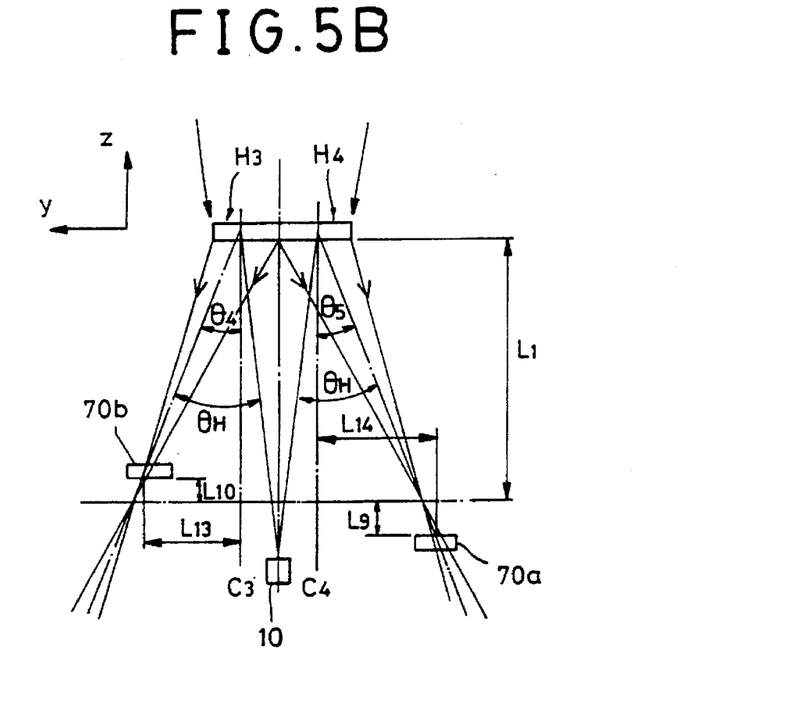
FIG. 5B is a view corresponding to FIG. 5A, but showing a laser beam diffracting and condensing operation of the third and fourth holograms of the hologram glass plate.

On the other hand, the inclination angle θ6 of the second object beam W3 with respect to the perpendicular of the hologram plate H' of FIG. 4B is equal to each of the diffraction angles θ4 and θ5 of the laser beams, condensed to the focusing photo detectors 70b and 70a, with respect to the perpendiculars C3 and C4 of the third and fourth holograms H3 and H4 of FIG. 5B. The distance L7 between the hologram plate H' and the condensed position of the second object beam W3 of FIG. 4B is equal to the differences of distances L1 and L10, the distance L1 being defined between the hologram glass plate 20 and the condensed position of the laser beams diffracted by the third and fourth hologram H3 and H4 and the distance L10 being defined between the condensed position of the diffracted laser beams and the second focusing photo detector 70b of FIG. 5B. In addition, the distance L8 between the hologram plate H' and the condensed position of the second reference beam W4 of FIG. 4B is equal to the sum of distances L1+L9, the distance L1 being defined between the hologram glass plate 20 and the condensed position of the laser beams diffracted by the third and fourth hologram H3 and H4 and the distance L9 being defined between the condensed position of the diffracted laser beams and the first focusing photo detector 70a.

Here, the distance L8 between the hologram late H' and the condensed position of the second reference beam W4 of FIG. 4B is equal to the distance L3 between the hologram glass plate 20 and the first focusing detector 70a of FIG. 3B.

If briefly described, the first to fourth holograms H1 to H4 of the hologram glass plate 20 are manufactured under the condition of θ3=θ1=θ2, L5=L7=L1, θ6=θ4=θ5 and L6=L8= L3.

The first and second holograms H1 and H2 are stuck on the glass plate 20 such that the direction shown in FIG. 5A agrees with the direction shown in FIG. 2B. The third and fourth holograms H3 and H4 are stuck on the glass plate 20 such that they are arranged on positions rotated from the directions of the first and second holograms H1 and H2 at an angle of 180° Thus, the first and second holograms H1 and H2 condense the laser beams to the tracking photo detectors 60a and 60b in opposite direction, respectively, as shown in FIG. 5A. Also, the third and fourth holograms H3 and H4 condense the laser beams to the focusing photo detectors 70b and 70a in opposite directions, respectively, as shown in FIG. 5B.

The tracking photo detectors 60a and 60b are located, as shown in FIG. 5A, on the positions spaced apart from the perpendiculars C1 and C2 of the first and second holograms H1 and H2 by distances L11 and L12, respectively. Here, the distances L11 and L12 are equal to each other and each is equal to L1.tan θ1, otherwise stated, L11=L12=L1.tan 1θ. The first focusing photo detector 70a is located, as shown in FIG. 5B, on a position spaced apart from the perpendicular C4 of the fourth hologram H4 by a distance L14. Here, the distance L14 is equal to L1.tan θ5+L9.tan θ5. In the same manner, the second focusing photo detector 70b is located, as shown in FIG. 5B, on a position spaced apart from the perpendicular C3 of the third hologram H3 by a distance L13. Here, the distance L13 is equal to L1.tan θ4−L10.tan θ4.

Figure 6A:
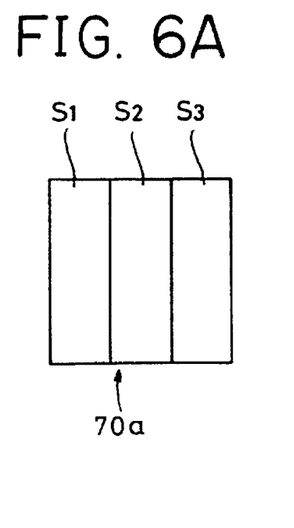
FIGS. 6A and 6B show in plan views the first and second focusing photo detectors each comprising three photo detecting elements, respectively.
Figure 6B:
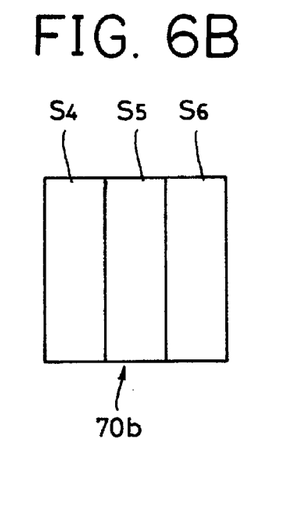

Referring next to FIGS. 6A and 6B, the first focusing photo detector 70a comprises three photo detecting elements S1 to S3. In the same manner, the second focusing photo detector 70b comprises three photo detecting elements S4 to S6.

Figure 6C:
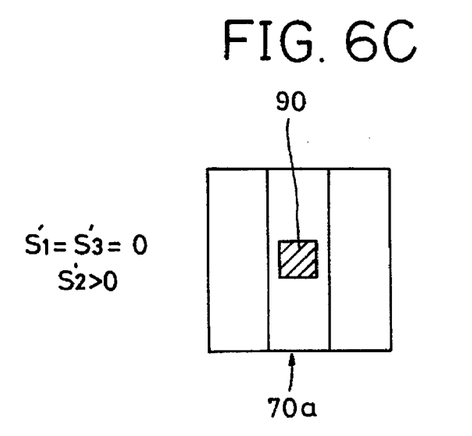
FIGS. 6C and 6D show in plan views the first and second focusing photo detectors when the diffracted laser beams are exactly condensed thereto, respectively.
Figure 6D:
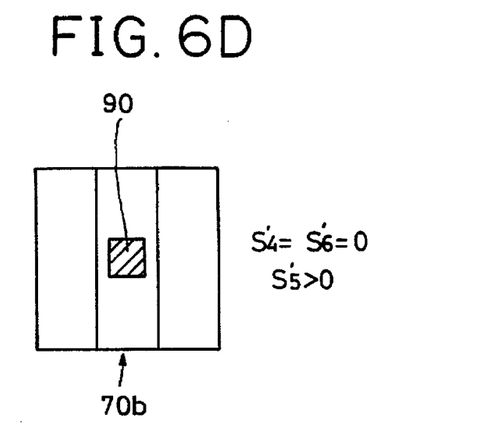

The level of signals S1' to S6', respectively detected by the elements S1 to S6, are represented in FIGS. 6C and 6D. That is, when the laser beam is exactly condensed to the pit of the optical disc 40 by the objective lens 50, the laser beam reflected by the disc 40 is condensed by the third and fourth holograms H3 and H4 of the hologram glass plate 20 and intercepted by the cutting surfaces of the focusing photo detectors 70a and 70b, located at the positions spaced from the plate 20 by the distances L3 and L4, respectively. The level of signals S1' to S6' detected by the photo detectors 70a and 70b are determined from the intensity of the laser beams intercepted by the cutting surfaces of the focusing photo detectors 70a and 70b.

The collimator 30 is located at a position spaced apart from the laser diode 10 by a distance LO which is equal to the focus of that collimator 30, as shown in FIG. 2A.

In FIG. 2A, the reference alphabets B1 and B2 denote the diffracted laser beam applied to the optical disc 40 and the laser beam reflected by the optical disc 40, respectively. In the same drawing, the reference numeral 90 denotes the laser beam emitted from the laser diode 10.

In addition, the signals S7' and S8' shown in FIGS. 10A–10D are detected by the tracking photo detectors 60a and 60b of FIG. 2A, respectively.

In operation of the above optical pickup device, the laser beam emitted from the laser diode 10 is received by the hologram glass plate 20 wherein a part of the incident laser beam is diffracted by the first to fourth holograms H1 to H4 of the plate 20.

Here, the laser beam diffracted by the first to fourth holograms Hi to H4 strays from the collimator 30 while the remaining laser beam B1 is received by the collimator 30.

The incident laser beam of the collimator 30 is changed into the parallel laser beam and focused on the optical disc 40 by the objective lens 50 and, thereafter, reflected by the optical disc The laser beam reflected by the optical disc 40 is in turn transmitted through the objective lens 50 and the collimator 30 in order. The laser beam is, thereafter, received by the hologram glass plate 20 in the form of the laser beam B2 condensed to the laser diode 10, the diode 10 being spaced apart from the collimator 30 by the distance LO equal to the focus of the collimator 30.

The incident laser beam of the hologram glass plate 20 is divided into four beams by the first to fourth holograms H1 to H4 and diffracted and condensed by the holograms H1 to H4 in four directions, that is, Y, −Y, X and −X directions. These laser beams are received by the tracking photo detectors 60a and 60b and the focusing photo detectors 70a and 70b, respectively. Upon reception of the laser beams, the photo detectors 60a, 60b, 70a and 70b detect the tracking signals and the focusing signals, respectively, thereby reading the information recorded on the optical disc 30.

Hereinbelow, it will be described the diffraction theory of the laser beam B2 condensed by the collimator 30 and diffracted by the first to fourth holograms Hi to H4 will be described.

Figure 2C:
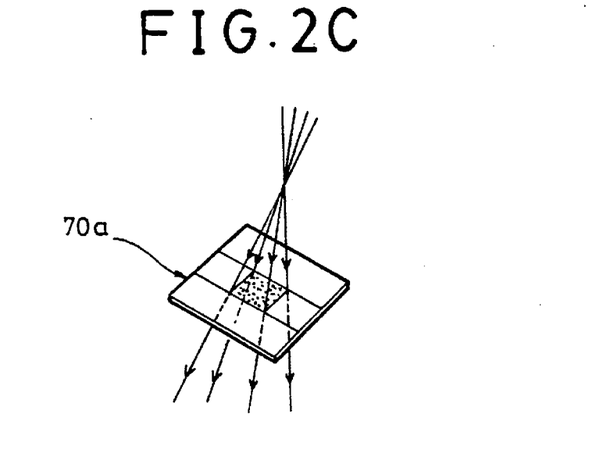
FIG. 2C is an enlarged perspective view of a first focusing photo detector shown at the section "a" of FIG. 2A.
Figure 2D:
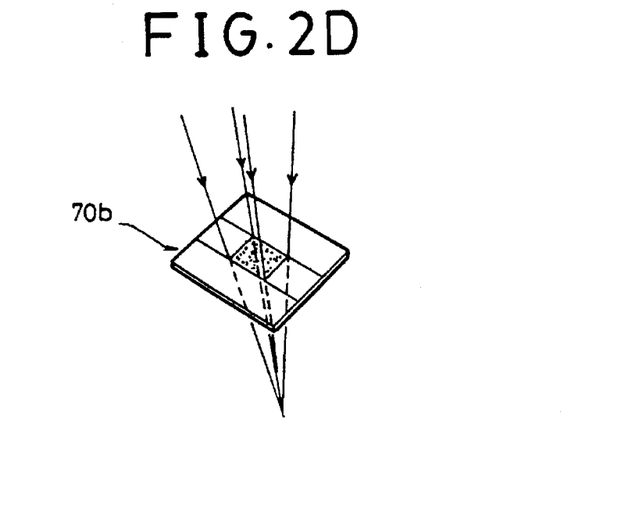
FIG. 2D is an enlarged perspective view of a second focusing photo detector shown at the section "ba" of FIG. 2A.

As shown in FIGS. 5A and 5B, the laser beam B2 reflected by the optical disc 40 is divided into four laser beams as a result of diffraction and condensing by the first to fourth holograms H1 to H4 of the hologram glass plate 20. When the laser beams are diffracted and condensed by the holograms H1 to H4, they have the diffraction angles of θ1=θ2=θ3 and θ4, wherein θ1=θ2=θ3 and θ4=θ5=θ6, and detected as laser beams condensed to the positions spaced apart from the hologram glass plate 20 by the distance L1=L5=L7. In this case, since each of the third and fourth holograms H3 and H4 of the hologram glass plate 20 has a rectangular shape as shown in FIG. 2B, the laser beams diffracted by the third and fourth holograms H3 and H4 are condensed to and detected by the focusing photo detectors 70b and 70a of the rectangular shape, respectively, as described in FIGS. 2C and 2D.

At this time, when the laser beams are exactly focused on the optical disc 40, the photo detecting elements S1 to S6 of the photo detectors 70a and 70b detect the signals S1' to S6' represented in FIGS. 6C and As represented in FIGS. 6C and 6D, when the laser beams are exactly focused on the optical disc 40, the levels of signal Si', S3', S4' and S6' respectively detected by the photo detecting elements S1, S3, S4 and S6 each is zero while the levels of signals S2' and S5' detected by the elements S2 and S5 are larger than zero, respectively. Thus, the signal for reading the information recorded on the optical disc 40 is determined as the sum of the signals S2' and S5'.

The process for compensating a focusing error and a tracking error by employing the aforementioned diffraction theory of the holograms H1 to H4 will be described hereinbelow in conjunction with FIGS. 7A to 10D.

As well known to those skilled in the art, the optical disc 40 cannot be always maintained at the same position when rotated and this causes a focusing error and/or a tracking error.

Figure 7A:
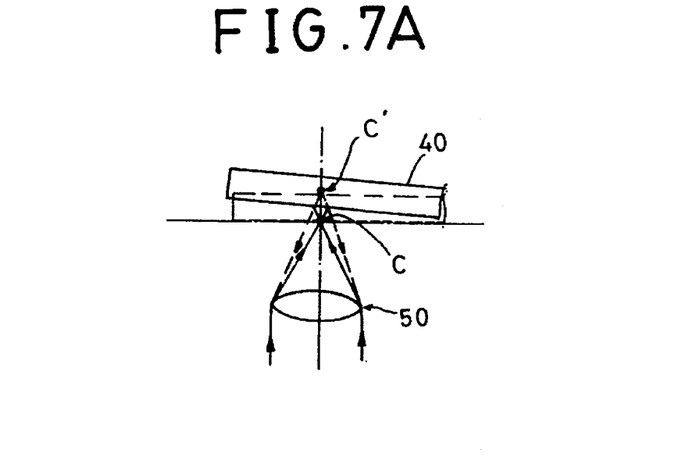
FIG. 7A is a schematic side view showing a focusing error caused by an axially distant displacement of the optical disc.
Figure 8A:
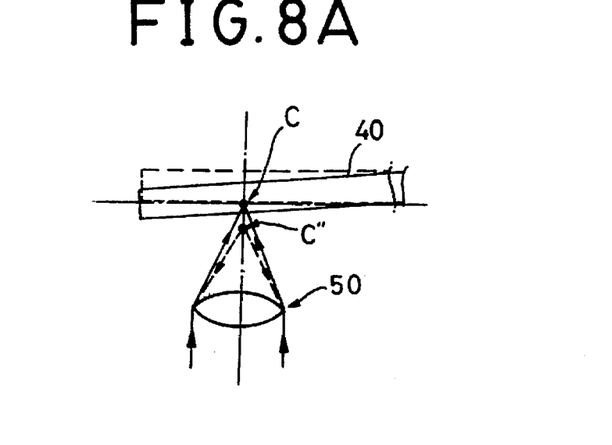
FIG. 8A is a schematic side view showing a focusing error caused by an axially approaching displacement of the optical disc.

That is, when the optical disc 40 is displaced to become more distant from the objective lens 50, the objective lens 50 focuses the laser beam on the point C' as shown in FIG. 7A. However, when the optical disc 40 is displaced to approach the objective lens 50, the objective lens 50 focuses the laser beam on the point C'' as shown in FIG. 8A. In both cases, focusing errors occur.

In addition to the above vertical displacement, the optical disc 40 is slightly displaced in the radial direction. Thus, the laser beam may not exactly focus on a pit of the optical disc 40 but may focus on a position straying from the desired pit in the X or Y direction, thereby causing the tracking error.

The compensation of the focusing error caused by the distant displacement of the optical disc 40 will be described in conjunction with FIG. 7A to 7D.

Figure 7B:
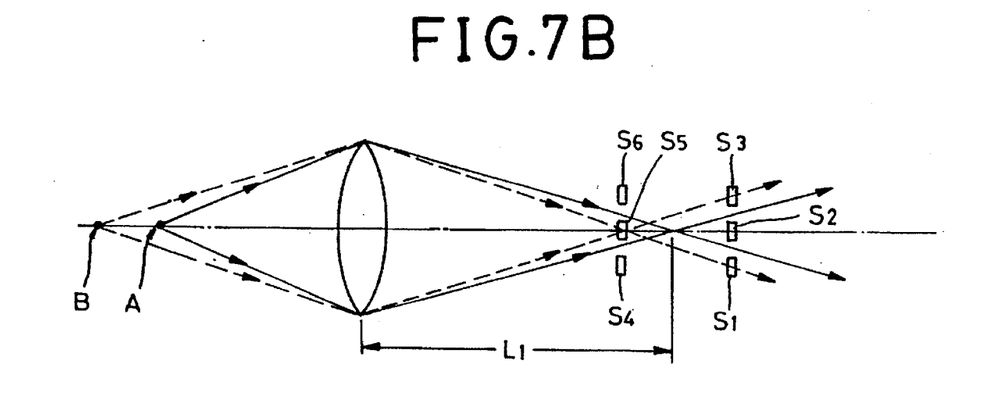
FIG. 7B is a schematic side view showing the laser beam condensed to the focusing photo detectors in the case of the distant displacement of the optical disc of FIG. 7A.

As shown in FIG. 7A, when the optical disc 40 is displaced to become more distant from the objective lens 50, the focused position C of the laser beam is displaced to the position C'. Such a displacement of the focused position of the laser beam causes the laser beams diffracted and condensed by the third and fourth holograms H3 and H4 to have a focus shorter than the desired distance L1 as shown in FIG. 7B.

Figure 7C:
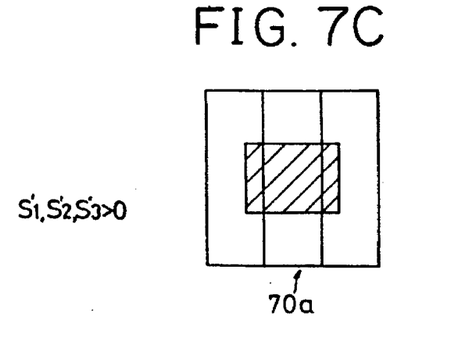
FIGS. 7C and 7D show in plan views the first and second focusing photo detectors for showing the laser beams detected thereby and the level of detecting signals in the case of the distant displacement of the optical disc, respectively.
Figure 7D:
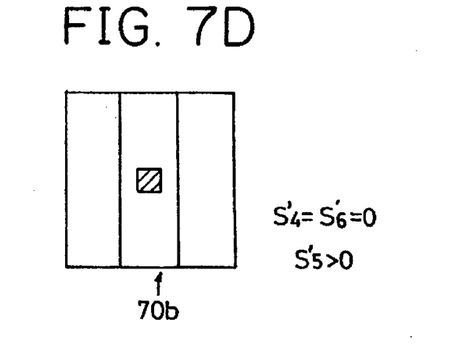

Thus, as shown in FIGS. 7C and 7D, all of the photo detecting elements S1 to S3 of the first focusing photo detector 70a detect the laser beam and the photo detecting element S5 of the second focusing photo detector 70b detects the laser beam. However, the remaining photo detecting elements S4 and S6 of the second focusing photo detector 70b detect no laser beam.

In this case, the first focusing photo detector 70a outputs a signal to the error compensating actuator 80, so that the laser beam is not detected by the two photo detecting elements S1 and S3. Upon reception of the signal, the actuator 80 moves the objective lens 50 downwards such that the laser beam is exactly focused on the optical disc 40.

On the other hand, the focusing error caused by the approaching displacement of the optical disc 40 is compensated as follows.

Figure 8B:
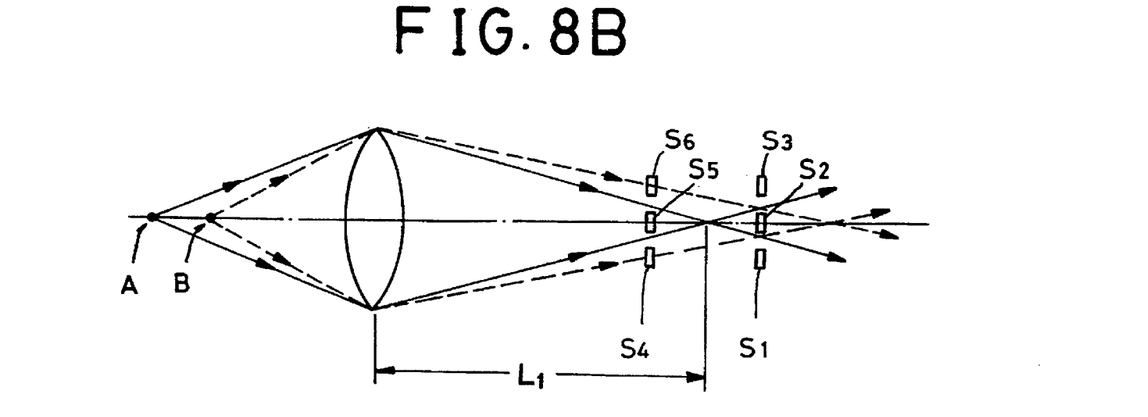
FIG. 8B is a schematic side view showing the laser beam condensed to the focusing photo detectors in the case of the approaching displacement of the optical disc of FIG. 8A.

As shown in FIG. 8A, when the optical disc 40 is displaced to approach the objective lens 50, the focused position C of the laser beam is displaced to the position C''. Such a displacement of the focused position of the laser beam causes the laser beams, diffracted and condensed by the third and fourth holograms H3 and H4, to have a focus longer than the desired distance L1 as shown in FIG. 8B.

Figure 8C:
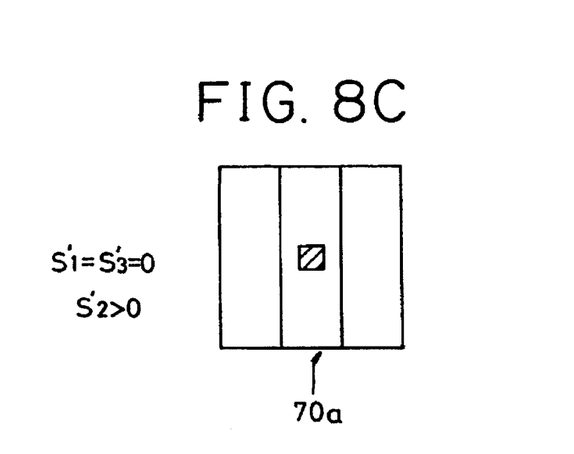
FIGS. 8C and 8D show in plan views the first and second focusing photo detectors for showing the laser beams detected thereby and the level of detecting signals in the case of the approaching displacement of the optical disc, respectively.
Figure 8D:
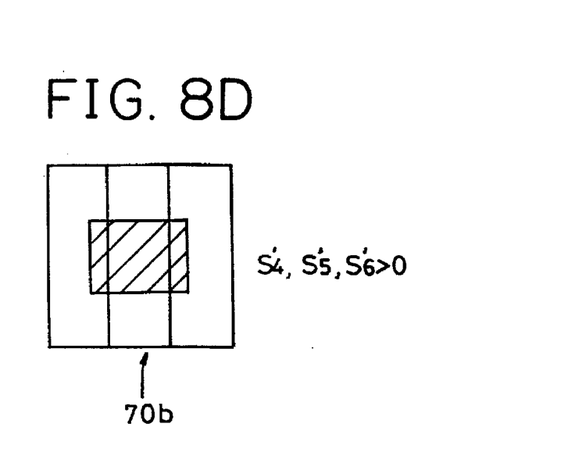

Thus, as shown in FIGS. 8C and 8D, all of the photo detecting elements S4 to S6 of the second focusing photo detector 70b detect the laser beam and the photo detecting element S2 of the first focusing photo detector 70a detects the laser beam. However, the remaining photo detecting elements S1 and S3 of the first focusing photo detector 70a detect no laser beam.

In this case, the second focusing photo detector 70b outputs a signal to the actuator 80, so that the laser beam is not detected by the two photo detecting elements S4 and S6. Upon reception of the signal, the actuator 80 moves the objective lens 40 upwards such that the laser beam is exactly focused on the optical disc 40.

As described above, the focusing error caused by the distant or approaching displacement of the optical disc 40 can be compensated.

Hereinbelow, the compensation of the tracking error caused by the radial displacement of the optical disc 40 will be described in conjunction with FIGS. 9A to 10D.

Figure 9A:
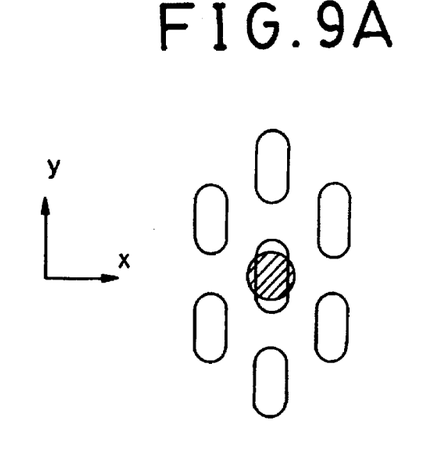
FIG. 9A shows pits of the optical disc when the laser beam is exactly focused on a pit.
Figure 9B:
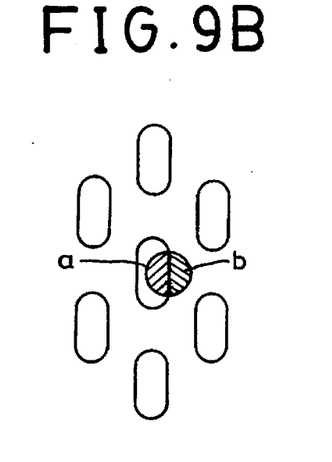
FIGS. 9B and 9C are views corresponding to FIG. 9A, but showing the optical discs radially displaced, resulting in tracking errors, respectively.

When the optical disc 40 is radially displaced such that its pits are positioned at a little to the X direction as shown in FIG. 9B, the laser beam strays from the pit of the disc 40 and is scattered. Thus, when the scattered laser beam is reflected by the optical disc 40, the reflected laser beam is increased in the quantity of light at the "b" section of FIG. 9B.

Figure 10A:
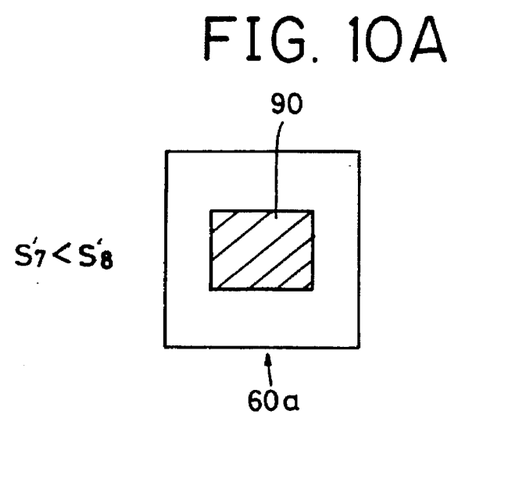
FIGS. 10A–10D are plan views of the first and second tracking photo detectors for showing the laser beams detected thereby and the level of detecting signals in the case of the radial displacements of the optical disc of FIGS. 9B and 9C, respectively.
Figure 10B:
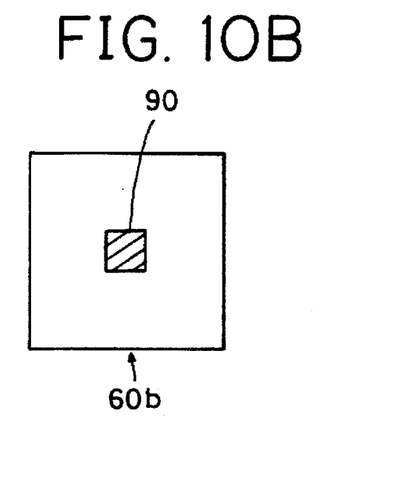

The reflected laser beam is, thereafter, divided into two laser beams by being diffracted by the first and second holograms Hi and H2 of the hologram glass plate 20. The two diffracted laser beams are condensed by the holograms H1 and H2 to the first and second tracking photo detectors 60a and 60b and detected thereby, respectively. At this time, the level of signal S7' detected by the first tracking photo detector 60a is lower than the level of signal S8' detected by the second tracking photo detector 60b due to the increase of the quantity of light at the "b" section as shown in FIGS. 10A and 10B.

The signals S7' and S8' of the tracking photo detectors 60a and 60b are, thereafter, outputted to the actuator 80. Upon reception of the signals S7' and S8', the actuator 80 moves the objective lens 50 in the −X direction and adjusts the straying focused position of the laser beam with respect to the pit of the optical disc 40 as shown in FIG. 9A, thereby compensating the tracking error caused by the X-directional radial displacement of the optical disc 40.

Figure 9C:
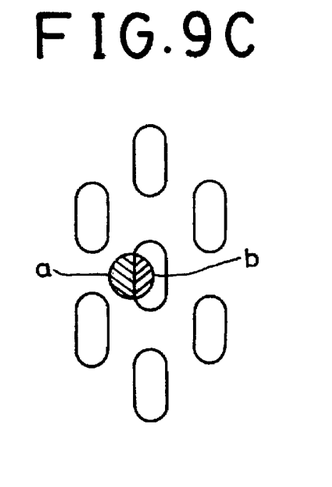

Meanwhile, when the optical disc 40 is radially displaced such that its pits are positioned at a little to the −X direction as shown in FIG. 9C, the laser beam strays from the pit of the disc 40 and is scattered. The scattered laser beam is thus increased in the quantity of light at the "a" section of FIG. 9C when reflected by the optical disc 40.

Figure 10C:
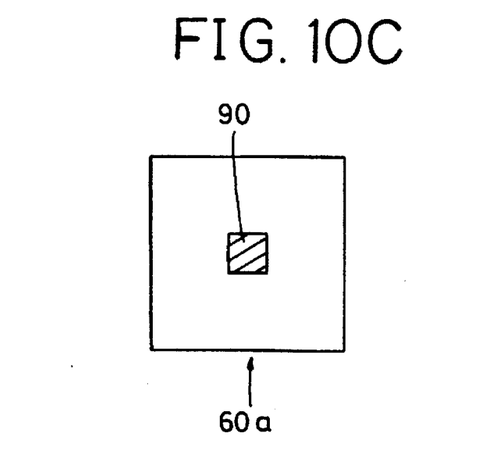
Figure 10D:
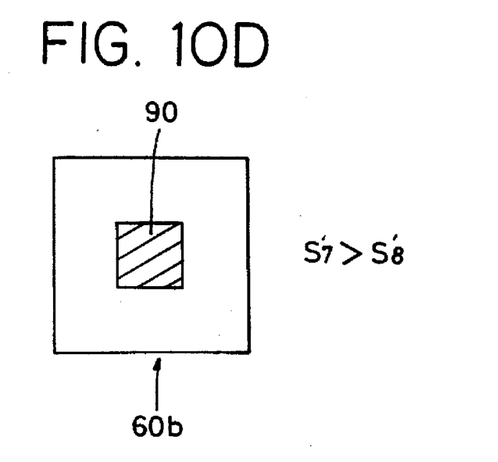

The reflected laser beam is, thereafter, divided into two laser beams by being diffracted by the first and second holograms H1 and H2 of the hologram glass plate 20. The two diffracted laser beams are condensed by the holograms H1 and H2 to the first and second tracking photo detectors 60a and 60b and detected thereby, respectively. At this time, the level of signal S7' of the first tracking photo detector 60a is higher than the level of signal S8' of the second tracking photo detector 60b due to the increase of the quantity of light at the "a" section, as shown in FIGS. 10C and 10D.

The signals S7' and S8' of the tracking photo detectors 60a and 60b are, thereafter, outputted to the actuator 80. Upon reception of the signals S7' and S8', the actuator 80 moves the objective lens 50 in the X direction and exactly adjusts the focused position of the laser beam with respect to the pit of the optical disc 40 as shown in FIG. 9A, thereby compensating the tracking error caused by the radial displacement of the optical disc 40.

As described above, the present invention provides an optical pickup device which uses holograms as optical elements and constructs the laser diodes and the photo detectors in a module, thereby reducing the time for reading the information recorded on the optical disc, resulting in improvement of the information reading velocity of the data playback apparatus, such as a compact disc player, using the optical pickup device. In addition, the optical pickup device using the holograms of the present invention can be prepared in mass production with a lower manufacturing cost and can achieve the recent trend of compactness and light weight.

Although the preferred embodiments of the present invention have been disclosed from illustrative purposes, those skilled in the art will appreciate that various modifications, additions and substitutions are possible, without departing from the scope and spirit of the invention as disclosed in the accompanying claims.

What is claimed is:

1. An optical pickup device comprising:
   a laser source for emitting a laser beam along an optical axis toward an optical disc;
   a hologram plate arranged between said laser source and the optical disc for diffracting the laser beam toward said optical disc, said hologram plate including first through fourth holograms for dividing a reflected laser beam into respective first through fourth return beams, said first and second holograms being arranged respectively along a first direction of said optical disc, said third and fourth holograms being arranged along a second direction of the optical disc between the first and second holograms;
   first photodetecting means for detecting a tracking error and a beam diffracted by said first and second holograms, including a first single element photodetector and a second single element photodetector;
   second photodetecting means for detecting a focusing error and read-out data, including a first three-element photodetector and a second three-element photodetector, said first three-element photodetector and said second three-element photodetector each including first, second and third photodetecting elements which are equally arranged in a third direction of the said optical disc, said first and second three-element photodetectors each detecting the beam diffracted by said third and fourth holograms, respectively, said first single element photodetector, said second single element photodetector, said first three-element photodetector and said second three-element photodetector being independently arranged at a 90° interval from one another around an outer periphery of said hologram plate.

2. The optical pickup device according to claim 1, wherein said first through fourth holograms are manufactured under the condition of the following relations:

$\theta1=\theta2, \theta4=\theta5, L1=L2+L9, L3=L1+L9$ and $L9=L10$ wherein L1 is an axial distance between said hologram plate and each of condensed positions of respective ones of said return beams diffracted by said first and second holograms; L2 and L3 are axial distances between said hologram plate and condensed positions of respective ones of said return beams diffracted by said third and fourth holograms, respectively; $\theta1, \theta2, \theta4$ and $\theta5$ are diffraction angles of the respective ones of said return beams diffracted by said first to fourth holograms with respect to the perpendicular of said hologram plate, respectively; and L9 and L10 are distances between said condensed position of the respective one of said return beams diffracted by said first hologram and said condensed position of the respective one of said return beams diffracted by said fourth hologram and between said condensed position of the respective one of said return beams diffracted by said first hologram and said condensed position of the respective one of said return beams diffracted by said third hologram, respectively.

3. The optical pickup device according to claim 2, wherein said first and second single-element photodetectors and said first and second three-element photodetecting elements are arranged at positions radially spaced apart from center axes of said first through fourth holograms by distances of L11, L12, L13 and L14, respectively, wherein $L11=L12=L1 \tan \theta1$, $L14=L1 \tan \theta5+L9 \tan \theta5$ and $L13=L1 \tan \theta4-L10 \tan \theta4$.

4. The optical pickup device according to claim 1, wherein a signal level detected by the second photodetecting elements of the first three-element photodetector and the second three-element photodetector is a read-out data, and a signal level detected by said first photodetecting elements and said second photodetecting elements is zero when the laser beam is focused on the optical disc.

5. The optical pickup device according to claim 1, wherein a signal level detected by the first single-element photodetector and the second single-element photodetector is equal when the laser beam is tracking on the optical disc.

6. An optical pickup apparatus comprising:
   a laser for generating a laser beam along an optical axis toward an optical disc;
   a hologram plate, arranged between said laser and said optical disc, for diffracting the laser beam toward said optical disc;
   a collimator and an objective lens, respectively arranged along the optical axis between said holographic plate and said optical disc, for collimating and focusing the laser beam on said optical disc,
   the laser beam incident on said optical disc being reflected back to said hologram plate through said collimator and said objective lens, said hologram plate diffracting and collimating the reflected laser beam into four return beams; and
   first through fourth photodetectors, arranged between said hologram plate and said laser, for detecting the four return beams, said first through fourth photodetectors each being independently arranged at 90 degree intervals around the outer periphery of said hologram plate, said hologram plate including first through fourth holograms which divide the reflected laser beam into respective first through fourth return beams and direct the first through fourth return beams to respective said first through fourth photodetectors, said first and second holograms being arranged respectively along a first direction and said third and fourth holograms being arranged respectively along a second direction, orthogonal to said first direction, in between said first and second holograms.

7. The optical pickup apparatus of claim 6, wherein said first and third photodetectors are arranged opposite each other along the outer periphery of said hologram plate in a first plane between said laser and said hologram plate and said second and fourth photodetectors are arranged along the outer periphery of said hologram plate in respective second and third planes, between said laser and said hologram plate, which are non-coplanar with said first plane.

8. The optical pickup apparatus of claim 7, wherein said second and fourth photodetectors respectively provide focusing signals, the optical pickup apparatus further comprising:

an objective lens driver, coupled to said second and fourth photodetectors, for driving said objective lens toward and away from said optical disc in accordance with said focusing signals, said second photodetector having first through third photodetecting elements for respectively providing first through third focusing signals and said fourth photodetecting element having fourth through sixth photodetecting elements for respectively providing fourth through sixth focusing signals, said objective lens driver moving said objective lens toward said optical disc along the optical axis when signal levels of each of said first through third and fifth focusing signals are greater than zero and signal levels of each of said fourth and sixth focusing signals are zero and moving said objective lens away from said optical disc along the optical axis when signal levels of each of said fourth through sixth and second focusing signals are greater than zero and signal levels of each of said first and third focusing signals are zero.

9. The optical pickup apparatus of claim 8, wherein said first and third photodetectors are also coupled to said objective lens driver, said objective lens driver moving said objective lens along a detector axis between said first and third photodetectors toward said first photo-detector when a signal level of said first photo-detector is lower than a signal level of said third photo-detector and moving said objective lens along the detector axis toward said third photo-detector when a signal level of said third photo-detector is lower than a signal level of said first photo-detector.

10. The optical pickup apparatus of claim 7, wherein said second plane of said first through third planes is closest to said hologram plate and said third plane is closest to said laser.

\* \* \* \* \*